(12) United States Patent
Kong et al.

(10) Patent No.: US 12,353,084 B2
(45) Date of Patent: Jul. 8, 2025

(54) DOUBLE SIDED DISPLAY APPARATUS

(71) Applicant: LG Display Co., Ltd., Seoul (KR)

(72) Inventors: Chang Kyeong Kong, Paju-si (KR); Yoon Ki Kim, Paju-si (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 18/813,916

(22) Filed: Aug. 23, 2024

(65) Prior Publication Data

US 2025/0102848 A1    Mar. 27, 2025

(30) Foreign Application Priority Data

Sep. 27, 2023  (KR) .......................... 10-2023-0130867

(51) Int. Cl.
*G02F 1/1333* (2006.01)
*F21V 8/00* (2006.01)
*G02F 1/1335* (2006.01)

(52) U.S. Cl.
CPC ..... *G02F 1/133342* (2021.01); *G02B 6/0051* (2013.01); *G02B 6/0053* (2013.01); *G02B 6/0076* (2013.01); *G02F 1/133528* (2013.01)

(58) Field of Classification Search
CPC .................. G02F 1/133342; G02B 6/0076
USPC .............................................. 349/61
See application file for complete search history.

(56) References Cited

U.S. PATENT DOCUMENTS

| 10,175,516 | B2* | 1/2019 | Li | G02F 1/133553 |
| 2005/0099793 | A1* | 5/2005 | Ogawa | G02B 6/0068 362/613 |
| 2018/0017729 | A1* | 1/2018 | Fukuoka | G02B 6/0068 |
| 2019/0064598 | A1* | 2/2019 | Du | G02B 6/0016 |
| 2021/0405405 | A1* | 12/2021 | Chiang | G02F 1/133342 |

FOREIGN PATENT DOCUMENTS

CN   107526215 A  * 12/2017

* cited by examiner

*Primary Examiner* — Christopher M Raabe
(74) *Attorney, Agent, or Firm* — Fenwick & West LLP (57) ABSTRACT

Disclosed is a dual display device. The dual display device includes a backlight unit having a light guide plate; a first display panel disposed on a first light exit surface of the backlight unit; and a second display panel disposed on a second light exit surface of the backlight unit opposite the first light exit surface, wherein the first display panel and the second display panel are mounted so as to be tilted at a predetermined angle with respect to the backlight unit. Accordingly, it is possible to reduce power consumption of the dual display device and to improve image quality.

12 Claims, 6 Drawing Sheets

| ITEM | Concept | SIMULATION RESULT - ILLUMINANCE | SIMULATION RESULT - BRIGHTNESS | Cross Cut X - axis (ILLUMINANCE) Y - axis (ILLUMINANCE) | Cross Cut Y - axis (ILLUMINANCE) | AVERAGE BRIGHTNESS (ref.CONTRAST%) | UNIFORMITY Min/max | EXPECTED FOS |
|---|---|---|---|---|---|---|---|---|
| A | | X Cross cut<br>LIGHT INCIDENT PORTION | LIGHT INCIDENT PORTION | | | 6847nit | 60.1% | |
| | | LIGHT INCIDENT PORTION | LIGHT INCIDENT PORTION | | | 6940nit | 59.6% | --- |
| B | | | | | | 6647nit | 54.4% | LIGHT INCIDENT PORTION DARKNESS LEVEL 2 |
| | | | | | | 6699nit | 57.1% | |

DOUBLE SIDED DISPLAY APPARATUS

CROSS-REFERENCE TO RELATED APPLICATION

This application claims the benefit of Republic of Korea Patent Application No. 10-2023-0130867, filed on Sep. 27, 2023, which is hereby incorporated by reference in its entirety.

BACKGROUND

Field of Technology

The present disclosure relates to a dual display device in which display panels share one backlight unit so as to be mounted on both surfaces of the backlight unit, and more particularly, to a heterogeneous dual display device in which the display panels mounted on both surfaces of the backlight unit are tilted at a predetermined angle.

Discussion of the Related Art

Generally, a display device displays images. For example, the display device may include a liquid crystal panel disposed on a backlight unit. The backlight unit may supply light to the liquid crystal panel. For example, the backlight unit may include at least one light source element. The liquid crystal panel may implement a specific image using an electric field formed between pixel electrodes and a common electrode. For example, the liquid crystal panel may include a liquid crystal layer disposed between a first display substrate and a second display substrate.

The display device may be installed in various places. For example, the display device may be installed in cars, subways, trains, stores, etc. In particular, in order to enable viewers to view the display device from opposite sides, two display panels may share one backlight unit so as to be mounted on both surfaces of the backlight unit.

However, if the two display panels are mounted parallel to both surfaces of the shared backlight unit, image quality may deteriorate depending on the viewer's viewing location.

In addition, even if the two display panels are mounted on both surfaces of the backlight unit so as to be tilted at a predetermined angle, brightness may not be uniform, and image quality (front-on-screen (FOS)) may deteriorate.

SUMMARY

Accordingly, the present disclosure is directed to a dual display device that substantially obviates one or more problems due to limitations and disadvantages of the related art.

An object of the present disclosure is to provide a heterogeneous dual display device capable of ensuring uniform brightness and improved image quality when two display panels are mounted on both surfaces of a backlight unit so as to be tilted at a predetermined angle suitable for the viewer's viewing location.

The objects to be accomplished by the present disclosure are not limited to the above-mentioned objects, and other objects not mentioned herein will be clearly understood by those skilled in the art from the following description.

Additional advantages, objects, and features of the disclosure will be set forth in part in the description which follows and in part will become apparent to those having ordinary skill in the art upon examination of the following or may be learned from practice of the disclosure. The objects and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a dual display device includes a backlight unit having a light guide plate; a first display panel disposed on a first light exit surface of the backlight unit; and a second display panel disposed on a second light exit surface of the backlight unit opposite the first light exit surface, wherein the first display panel and the second display panel are mounted so as to be tilted at a predetermined angle with respect to the backlight unit.

The dual display device may further include a first diffusion sheet disposed on a back surface of the first display panel facing the first light exit surface of the backlight unit; and a second diffusion sheet disposed on a back surface of the second display panel facing the second light exit surface of the backlight unit.

The dual display device may further includes, in place of the first diffusion sheet and the second diffusion sheet: a first polarizing plate disposed on the back surface of the first display panel facing the first light exit surface of the backlight unit, the first polarizing plate having the same haze as the first diffusion sheet; and a second polarizing plate disposed on the back surface of the second display panel facing the second light exit surface of the backlight unit, the second polarizing plate having the same haze as the second diffusion sheet.

The first display panel and the second display panel may be tilted at an angle of 1 to 25 degrees.

The backlight unit may include a light source configured to emit light to a light incident surface of the light guide plate, a first optical sheet located on a first light exit surface of the light guide plate, and a second optical sheet located on a second light exit surface of the light guide plate. The first display panel and the second display panel may be tilted at a predetermined angle with respect to the backlight unit about an edge of a surface of the light guide plate opposite the light incident surface of the light guide plate.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

The details of the above objects, technical configurations, and effects of the present disclosure will be clearly understood from the following detailed description taken in conjunction with the accompanying drawings showing embodiments of the present disclosure. Although exemplary embodiments of the present disclosure will be described, it will be apparent that the technical spirit of the present disclosure can be practiced by those skilled in the art without being restricted or limited to the embodiments.

Further, throughout the specification, the same reference numerals represent the same components, and in the drawings, the length and thickness of layers or areas may be exaggerated for the sake of convenience. In addition, when a first element is referred to as being "on" a second element, it can be directly on the second element or be indirectly on the second element with a third element interposed therebetween.

It will be understood that the terms "first" and "second" are used herein to describe various elements and are only used to distinguish one element from another element. Thus, a first element may be termed a second element, and similarly, a second element may be termed a first element without departing from the teachings of the present disclosure.

Terms used in the following description are used only to describe the specific embodiments and are not intended to restrict the present disclosure. The expression of singularity includes a plural meaning unless the singularity expression is explicitly different in context. In the specification, the terms "comprising," "including," and "having" shall be understood to designate the presence of particular features, numbers, steps, operations, elements, parts, or combinations thereof but not to preclude the presence or addition of one or more other features, numbers, steps, operations, elements, parts, or combinations thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of pertinent technology, and should not be interpreted as having ideal or excessively formal meanings unless clearly defined in the specification.

In order to implement a dual display device using a liquid crystal display device, two liquid crystal display panels may be used.

Figure 1:
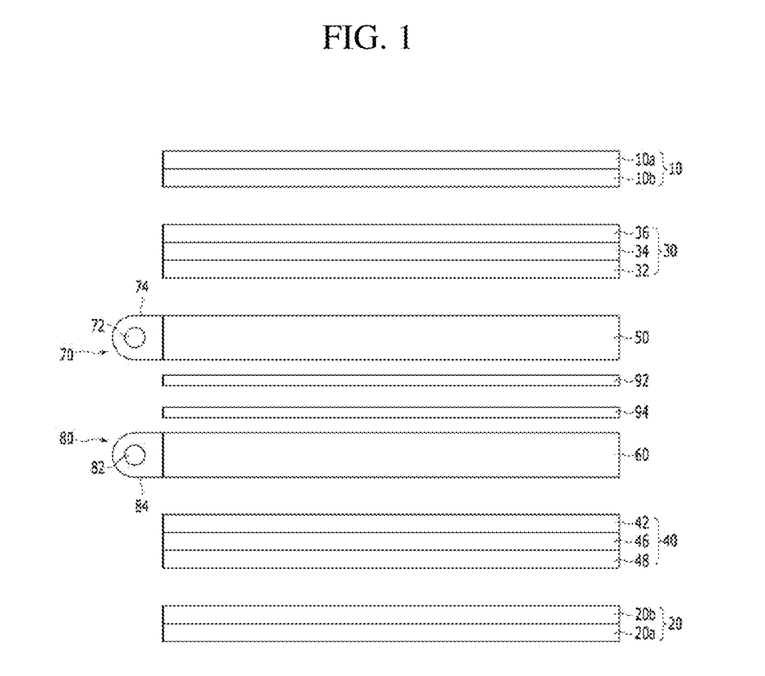
FIG. 1 is a schematic cross-sectional view of a dual display device implemented using a liquid crystal display device according to one embodiment.

FIG. 1 is a schematic cross-sectional view of a dual display device implemented using a liquid crystal display device.

As shown in FIG. 1, the dual display device implemented using a liquid crystal display device includes first and second liquid crystal panels 10 and 20 and backlight units 70 and 80 disposed between the first and second liquid crystal panels 10 and 20 and configured to emit light to the first and second liquid crystal panels 10 and 20, respectively.

The first liquid crystal panel 10 includes an upper substrate 10*a* and a lower substrate 10*b* with a liquid crystal injected therebetween, and includes a spacer (not shown) for maintaining a constant gap between the upper substrate 10*a* and the lower substrate 10*b*. The second liquid crystal panel 20 includes an upper substrate 20*a* and a lower substrate 20*b* with a liquid crystal injected therebetween, and includes a spacer (not shown) for maintaining a constant gap between the upper substrate 20*a* and the lower substrate 20*b*.

A plurality of black matrices and color filters are formed on each of the upper substrates 10*a* and 20*a* of the first and second liquid crystal panels 10 and 20. In addition, signal wires such as a plurality of gate lines (not shown) and data lines (not shown) are formed on each of the lower substrates 10*b* and 20*b* of the first and second liquid crystal panels 10 and 20, and a plurality of thin-film transistors is formed in intersection areas between the gate lines and the data lines.

A lower polarizing plate (not shown) is attached to the back surface of each of the first and second liquid crystal panels 10 and 20 in order to polarize light from each of the backlight units 70 and 80, and an upper polarizing plate (not shown) is attached to the front surface of each of the first and second liquid crystal panels 10 and 20 in order to polarize light that has passed through each of the first and second liquid crystal panels 10 and 20.

The backlight units 70 and 80 include light sources 72 and 82, light source housings 74 and 84 surrounding the light sources, light guide plates 50 and 60 configured to guide light introduced thereinto from the light sources 72 and 82 to travel to the first and second liquid crystal panels 10 and 20, a first optical sheet 30 stacked on the front surface of the light guide plate 50, and a second optical sheet 40 stacked on the back surface of the light guide plate 60. Each of the first optical sheet 30 and the first optical sheet 40 includes a plurality of optical sheets 32, 34, 36, 42, 44 and 46.

Each of the light sources 72 and 82 may be implemented as one or more light-emitting diodes (LEDs) disposed in a row on a flexible circuit board (not shown), and may be disposed on one side surface of a corresponding one of the light guide plates 50 and 60. Light emitted from each of the light sources 72 and 82 is introduced into a corresponding one of the light guide plates 50 and 60 through a light incident surface formed on the side surface of each of the light guide plates 50 and 60. Each of the light source housings 74 and 84 includes a reflective surface formed on the inner surface thereof. Light emitted from each of the light sources 72 and 82 is reflected by the reflective surface of a corresponding one of the light source housings 74 and 84 and travels to the light incident surface of a corresponding one of the light guide plates 50 and 60.

Each of the light guide plates 50 and 60 converts the light introduced thereinto from a corresponding one of the light sources 72 and 82 through the light incident surface thereof into light distributed over the surface thereof, and guides the converted light to travel to a corresponding one of the first and second liquid crystal panels 10 and 20.

The first optical sheet 30 is attached to the front surface of the light guide plate 50, and includes one or more first diffusion sheets 32 and one or more first prism sheets 34 and 36. The first optical sheet 30 serves to allow light introduced thereinto from the surface of the light guide plate 50 to be diffused and evenly radiated to the entire area of the first liquid crystal panel 10.

The second optical sheet 40 is attached to the back surface of the light guide plate 60, and includes one or more second diffusion sheets 42 and one or more second prism sheets 44 and 46. The second optical sheet 40 serves to allow light introduced thereinto from the surface of the light guide plate 60 to be diffused and evenly radiated to the entire area of the second liquid crystal panel 20.

A lower cover 92 of the first liquid crystal panel 10 and a lower cover 94 of the second liquid crystal panel 20 may be included.

The dual display device described with reference to FIG. 1 requires two liquid crystal panels 10 and 20, two optical sheets 30 and 40, two light guide plates 50 and 60, and two light sources 72 and 82, thus leading to increase in cost and increase in power consumption.

In order to overcome this drawback, a dual display device may be implemented using two liquid crystal panels and one backlight unit. Such a dual display device may be configured such that two liquid crystal panels are attached to both sides of a backlight unit.

Figure 2:
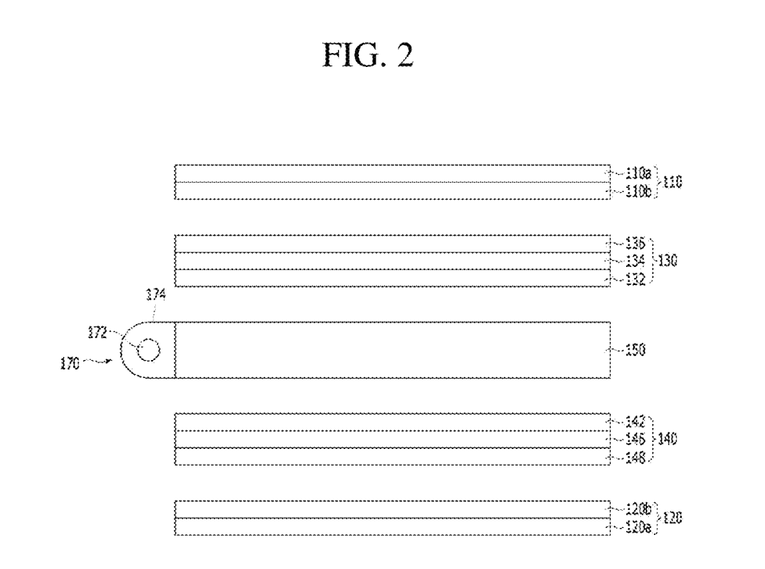
FIG. 2 is a schematic cross-sectional view of a dual display device using one backlight unit according to one embodiment.

FIG. 2 is a schematic cross-sectional view of a dual display device using one backlight unit according to one embodiment.

As shown in FIG. 2, a dual display device implemented using one backlight unit includes first and second liquid crystal panels 110 and 120 and a backlight unit 170 disposed between the first and second liquid crystal panels 110 and 120 and configured to emit light to the first and second liquid crystal panels 110 and 120.

The first liquid crystal panel 110 includes an upper substrate 110*a* and a lower substrate 110*b* with a liquid crystal injected therebetween, and includes a spacer (not shown) for maintaining a constant gap between the upper substrate 110*a* and the lower substrate 110*b*. The second liquid crystal panel 120 includes an upper substrate 120*a* and a lower substrate 120*b* with a liquid crystal injected therebetween, and includes a spacer (not shown) for maintaining a constant gap between the upper substrate 120*a* and the lower substrate 120*b*.

A plurality of black matrices and color filters are formed on each of the upper substrates 110*a* and 120*a* of the first and second liquid crystal panels 110 and 120.

Signal wires such as a plurality of gate lines (not shown) and data lines (not shown) are formed on each of the lower substrates 110*b* and 120*b* of the first and second liquid crystal panels 110 and 120, and a plurality of thin-film transistors is formed in intersection areas between the gate lines and the data lines.

An upper polarizing plate (not shown) is attached to the front surface of each of the first and second liquid crystal panels 110 and 120 in order to polarize light from the backlight unit 170, and a lower polarizing plate (not shown) is attached to the back surface of each of the first and second liquid crystal panels 110 and 120 in order to polarize light that has passed through each of the first and second liquid crystal panels 110 and 120.

The backlight unit 170 includes a light source 172, a light source housing 174 surrounding the light source, a light guide plate 150 configured to guide light introduced thereinto from the light source 172 to travel to the first and second liquid crystal panels 110 and 120, a first optical sheet 130 stacked on the front surface of the light guide plate 150, and a second optical sheet 140 stacked on the back surface of the light guide plate 150.

The light source 172 may be implemented as one or more light-emitting diodes (LEDs) disposed in a row on a flexible circuit board (not shown), and may be disposed on one side surface of the light guide plate 150. Light emitted from the light source 172 is introduced into the light guide plate 150 through a light incident surface formed on the side surface of the light guide plate 150. The light source housing 174 includes a reflective surface formed on the inner surface thereof. Light emitted from the light source 172 is reflected by the reflective surface of the light source housing 174 and travels to the light incident surface of the light guide plate 150.

The light guide plate 150 converts the light introduced thereinto from the light source 172 through the light incident surface thereof into light distributed over the surface thereof, and guides the converted light to travel to the first and second liquid crystal panels 110 and 120.

The first optical sheet 130 is attached to the front surface of the light guide plate 150, and includes one or more first diffusion sheets 132 and one or more first prism sheets 134 and 136. The first optical sheet 130 serves to allow light introduced thereinto from the surface of the light guide plate 150 to be diffused and evenly radiated to the entire area of the first liquid crystal panel 110.

The second optical sheet 140 is attached to the back surface of the light guide plate 150, and includes one or more second diffusion sheets 142 and one or more second prism sheets 144 and 146. The second optical sheet 140 serves to allow light introduced thereinto from the surface of the light guide plate 150 to be diffused and evenly radiated to the entire area of the second liquid crystal panel 120.

The dual display device implemented using one backlight unit 170 may reduce cost and power consumption compared to the dual display device shown in FIG. 1.

However, although the dual display device is implemented using one backlight unit as shown in FIG. 2, image quality may deteriorate depending on the installation place or the viewing location.

Figure 3:
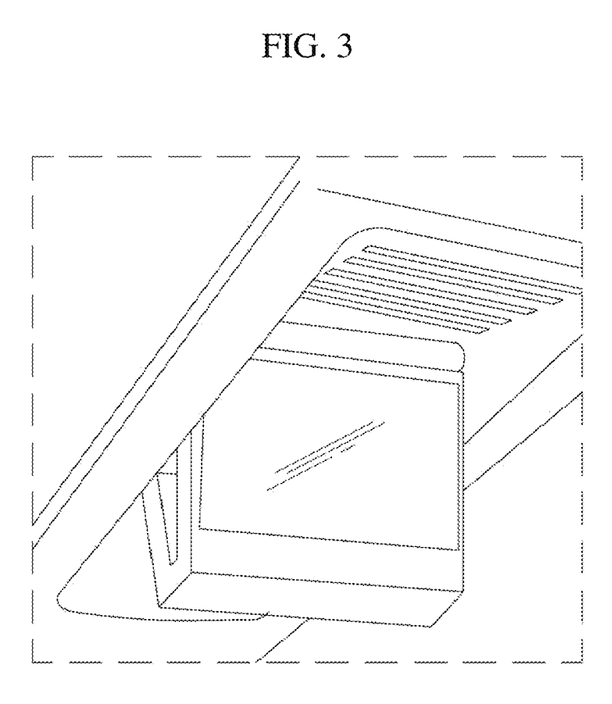
FIG. 3 is a view showing a place in which a dual display device is installed according to an embodiment of the present disclosure.

FIG. 3 is a view showing a place in which the dual display device is installed according to the embodiment of the present disclosure.

Referring to FIG. 3, the dual display device according to the embodiment of the present disclosure may be installed, for example, on the ceiling of a cabin of a subway or a train (e.g., Korea Train eXpress (KTX) or Super Rapid Train (SRT)), on the roof of a taxi, on the ceiling of a large store, on the ceiling of a waiting room of a train or bus station, or on a platform of a train or bus station.

FIG. 3 shows a case in which the dual display device is installed on the ceiling of a cabin of a train.

In the case of the cabin of KTX or SRT, there are seats facing the forward direction and seats facing the backward direction. The dual display device is installed on the middle of the ceiling of the cabin, specifically, in the boundary area between the seats facing the forward direction and the seats facing the backward direction, so that all the passengers sitting in the seats facing the forward direction and the seats facing the backward direction are capable of viewing the dual display device.

In the case in which the dual display device is installed on the ceiling of a cabin of a train, the dual display device is located at a higher position than the viewing location of the viewer (passenger).

However, when the dual display device described with reference to FIGS. 1 and 2 is installed on the ceiling of a cabin of a train, i.e., at a higher position than the viewing location of the viewer (passenger), it may be impossible for the viewer (passenger) to view images displayed on the dual display device.

Therefore, the two display panels mounted on both surfaces of the backlight unit need to be tilted at a predetermined angle so as to face the viewer's viewing location.

However, although the two display panels are mounted on both surfaces of the backlight unit so as to be tilted at a predetermined angle, there may occur problems that the viewer feels a sense of difference in transparency, i.e., feels as if an image floats above the display panel, brightness is not uniform, and image quality deteriorates.

Therefore, there is a demand for a dual display device capable of preventing occurrence of a sense of difference in transparency and ensuring uniform brightness when two display panels are mounted on both surfaces of a backlight unit so as to be tilted at a predetermined angle.

Figure 4:
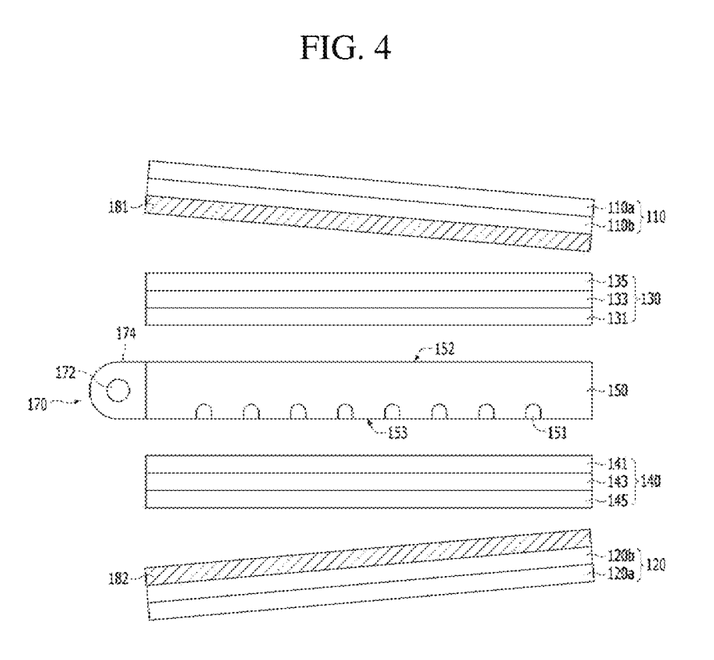
FIG. 4 is a schematic cross-sectional view of a dual display device according to an embodiment of the present disclosure.

FIG. 4 is a schematic cross-sectional view of a dual display device according to an embodiment of the present disclosure.

As shown in FIG. 4, the dual display device according to an embodiment of the present disclosure may include first and second liquid crystal panels 110 and 120 and a backlight unit 170 disposed between the first and second liquid crystal panels 110 and 120 and configured to emit light to the first and second liquid crystal panels 110 and 120.

The first and second liquid crystal panels 110 and 120 may be disposed on both sides of the backlight unit 170 so as to be tilted at a predetermined angle with respect to the backlight unit 170.

The first liquid crystal panel 110 may include an upper substrate 110a and a lower substrate 110b with a liquid crystal injected therebetween, and may include a spacer (not shown) for maintaining a constant gap between the upper substrate 110a and the lower substrate 110b. The second liquid crystal panel 120 may include an upper substrate 120a and a lower substrate 120b with a liquid crystal injected therebetween, and may include a spacer (not shown) for maintaining a constant gap between the upper substrate 120a and the lower substrate 120b.

A plurality of black matrices and color filters may be formed on each of the upper substrates 110a and 120a of the first and second liquid crystal panels 110 and 120.

Signal wires such as a plurality of gate lines (not shown) and data lines (not shown) may be formed on each of the lower substrates 110b and 120b of the first and second liquid crystal panels 110 and 120, and a plurality of thin-film transistors may be formed in intersection areas between the gate lines and the data lines.

An upper polarizing plate (not shown) may be attached to the front surface of each of the first and second liquid crystal panels 110 and 120 in order to polarize light from the backlight unit 170, and a lower polarizing plate (not shown) may be attached to the back surface of each of the first and second liquid crystal panels 110 and 120 in order to polarize light that has passed through each of the first and second liquid crystal panels 110 and 120.

In addition, a first diffusion sheet 181 may be disposed on the back surface of the lower substrate 110b of the first liquid crystal panel 110, and a second diffusion sheet 182 may be disposed on the back surface of the lower substrate 120b of the second liquid crystal panel 120.

The backlight unit 170 may include a light source 172, a light source housing 174 surrounding the light source, a light guide plate 150 configured to guide light introduced thereinto from the light source 172 to travel to the first and second liquid crystal panels 110 and 120, a first optical sheet 130 stacked on the front surface of the light guide plate 150, and a second optical sheet 140 stacked on the back surface of the light guide plate 150.

The light source 172 may be implemented as one or more light-emitting diodes (LEDs) disposed in a row on a flexible circuit board (not shown), and may be disposed on one side surface of the light guide plate 150. Light emitted from the light source 172 is introduced into the light guide plate 150 through a light incident surface formed on the side surface of the light guide plate 150. The light source housing 174 may include a reflective surface formed on the inner surface thereof. Light emitted from the light source 172 is reflected by the reflective surface of the light source housing 174 and travels to the light incident surface of the light guide plate 150.

The light guide plate 150 converts the light introduced thereinto from the light source 172 through the light incident surface thereof into light distributed over the surface thereof, and guides the converted light to travel to the first and second liquid crystal panels 110 and 120.

The light guide plate 150 may include two light exit surfaces 152 and 153 from which light introduced into the light guide plate 150 from the light source 172 is radiated to the first and second liquid crystal panels 110 and 120, respectively, and a concave pattern 151 or a convex pattern is formed on at least one of the two light exit surfaces 152 and 153.

Although the light guide plate 150 is illustrated in FIG. 4 as including a concave pattern 151 formed on the light exit surface 153, the disclosure is not limited thereto.

The first optical sheet 130 may be attached to the front surface of the light guide plate 150, and may include one or more third diffusion sheets 131 and 135 and one or more first prism sheets 133. The first optical sheet 130 may serve to allow light introduced thereinto from the surface of the light guide plate 150 to be diffused and evenly radiated to the entire area of the first liquid crystal panel 110.

The second optical sheet 140 may be attached to the back surface of the light guide plate 150, and may include one or more fourth diffusion sheets 141 and 145 and one or more second prism sheets 143. The second optical sheet 140 may serve to allow light introduced thereinto from the surface of the light guide plate 150 to be diffused and evenly radiated to the entire area of the second liquid crystal panel 120.

Although the first optical sheet 130 is illustrated in FIG. 4 as including two diffusion sheets 131 and 135 and one prism sheet 133 and the second optical sheet 140 is illustrated in FIG. 4 as including two diffusion sheets 141 and 145 and one prism sheet 143, the disclosure is not limited thereto. Each of the first and second optical sheets 130 and 140 may include one diffusion sheet and two prism sheets.

As shown in FIG. 4, the first liquid crystal panel 110 and the first diffusion sheet 181 are tilted at a predetermined angle with respect to the backlight unit 170, and the second liquid crystal panel 120 and the second diffusion sheet 182 are also tilted at a predetermined angle with respect to the backlight unit 170.

That is, the first liquid crystal panel 110 and the first diffusion sheet 181 are mounted so as to be tilted about the edge of the backlight unit 170 at which the light source 172 is not disposed, and the second liquid crystal panel 120 and the second diffusion sheet 182 are mounted so as to be tilted about the edge of the backlight unit 170 at which the light source 172 is not disposed.

In other embodiments, the first diffusion sheet 181 and the second diffusion sheet 182 may be omitted from the dual display device according to the embodiment of the present disclosure shown in FIG. 4.

Figure 5:
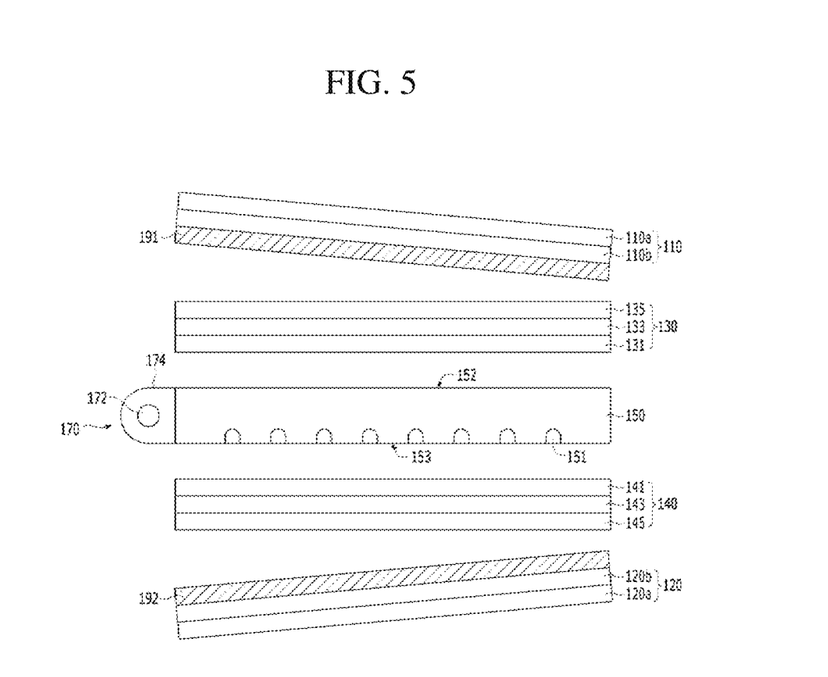
FIG. 5 is a schematic cross-sectional view of a dual display device according to another embodiment of the present disclosure.

FIG. 5 is a schematic cross-sectional view of a dual display device according to another embodiment of the present disclosure.

As described above, an upper polarizing plate (not shown) may be attached to the front surface of each of the first and second liquid crystal panels 110 and 120 in order to polarize light from the backlight unit 170, and a lower polarizing plate (not shown) may be attached to the back surface of each of the first and second liquid crystal panels 110 and 120 in order to polarize light that has passed through each of the first and second liquid crystal panels 110 and 120.

In this embodiment, in place of the first diffusion sheet 181 and the second diffusion sheet 182, lower polarizing plates 191 and 192 having the same haze as the first and second diffusion sheets 181 and 182 may be attached to the back surfaces of the first and second liquid crystal panels 110 and 120, respectively.

As shown in FIG. 5, the dual display device according to another embodiment of the present disclosure may include first and second liquid crystal panels 110 and 120 and a backlight unit 170 disposed between the first and second liquid crystal panels 110 and 120 and configured to emit light to the first and second liquid crystal panels 110 and 120.

The first and second liquid crystal panels 110 and 120 may be disposed on both sides of the backlight unit 170 so as to be tilted at a predetermined angle with respect to the backlight unit 170.

The first liquid crystal panel 110 may include an upper substrate 110*a* and a lower substrate 110*b* with a liquid crystal injected therebetween, and may include a spacer (not shown) for maintaining a constant gap between the upper substrate 110*a* and the lower substrate 110*b*. The second liquid crystal panel 120 may include an upper substrate 120*a* and a lower substrate 120*b* with a liquid crystal injected therebetween, and may include a spacer (not shown) for maintaining a constant gap between the upper substrate 120*a* and the lower substrate 120*b*.

A plurality of black matrices and color filters may be formed on each of the upper substrates 110*a* and 120*a* of the first and second liquid crystal panels 110 and 120.

Signal wires such as a plurality of gate lines (not shown) and data lines (not shown) may be formed on each of the lower substrates 110*b* and 120*b* of the first and second liquid crystal panels 110 and 120, and a plurality of thin-film transistors may be formed in intersection areas between the gate lines and the data lines.

An upper polarizing plate (not shown) may be attached to the front surface of each of the first and second liquid crystal panels 110 and 120 in order to polarize light from the backlight unit 170. A first lower polarizing plate 191 may be attached to the back surface of the first liquid crystal panel 110 in order to polarize light that has passed through the first liquid crystal panel 110, and a second lower polarizing plate 192 may be attached to the back surface of the second liquid crystal panel 120 in order to polarize light that has passed through the second liquid crystal panel 120.

The first and second lower polarizing plates 191 and 192 have the same haze as the first and second diffusion sheets 181 and 182 described with reference to FIG. 4.

The backlight unit 170 may include a light source 172, a light source housing 174 surrounding the light source, a light guide plate 150 configured to guide light introduced thereinto from the light source 172 to travel to the first and second liquid crystal panels 110 and 120, a first optical sheet 130 stacked on the front surface of the light guide plate 150, and a second optical sheet 140 stacked on the back surface of the light guide plate 150.

The light source 172 may be implemented as one or more light-emitting diodes (LEDs) disposed in a row on a flexible circuit board (not shown), and may be disposed on one side surface of the light guide plate 150. Light emitted from the light source 172 is introduced into the light guide plate 150 through a light incident surface formed on the side surface of the light guide plate 150. The light source housing 174 may include a reflective surface formed on the inner surface thereof. Light emitted from the light source 172 is reflected by the reflective surface of the light source housing 174 and travels to the light incident surface of the light guide plate 150.

The light guide plate 150 converts the light introduced thereinto from the light source 172 through the light incident surface thereof into light distributed over the surface thereof, and guides the converted light to travel to the first and second liquid crystal panels 110 and 120.

The light guide plate 150 may include two light exit surfaces 152 and 153 from which light introduced into the light guide plate 150 from the light source 172 is radiated to the first and second liquid crystal panels 110 and 120, respectively, and a concave pattern 151 or a convex pattern is formed on at least one of the two light exit surfaces 152 and 153.

Although the light guide plate 150 is illustrated in FIG. 5 as including a concave pattern 151 formed on the light exit surface 153, the disclosure is not limited thereto.

The first optical sheet 130 may be attached to the front surface of the light guide plate 150, and may include one or more third diffusion sheets 131 and 135 and one or more first prism sheets 133. The first optical sheet 130 may serve to allow light introduced thereinto from the surface of the light guide plate 150 to be diffused and evenly radiated to the entire area of the first liquid crystal panel 110.

The second optical sheet 140 may be attached to the back surface of the light guide plate 150, and may include one or more fourth diffusion sheets 141 and 145 and one or more second prism sheets 143. The second optical sheet 140 may serve to allow light introduced thereinto from the surface of the light guide plate 150 to be diffused and evenly radiated to the entire area of the second liquid crystal panel 120.

Although the first optical sheet 130 is illustrated in FIG. 5 as including two diffusion sheets 131 and 135 and one prism sheet 133 and the second optical sheet 140 is illustrated in FIG. 5 as including two diffusion sheets 141 and 145 and one prism sheet 143, the disclosure is not limited thereto. Each of the first and second optical sheets 130 and 140 may include one diffusion sheet and two prism sheets.

As shown in FIG. 5, the first liquid crystal panel 110 and the first lower polarizing plate 191 are tilted at a predetermined angle with respect to the backlight unit 170, and the second liquid crystal panel 120 and the second lower polarizing plate 192 are also tilted at a predetermined angle with respect to the backlight unit 170.

That is, the first liquid crystal panel 110 and the first lower polarizing plate 191 are mounted so as to be tilted about the edge of the backlight unit 170 at which the light source 172 is not disposed, and the second liquid crystal panel 120 and the second lower polarizing plate 192 are mounted so as to be tilted about the edge of the backlight unit 170 at which the light source 172 is not disposed.

As described above with reference to FIG. 4, the dual display device according to the embodiment of the present disclosure is configured such that the first diffusion sheet 181 is disposed on the back surface of the lower substrate 110*b* of the first liquid crystal panel 110 and the second diffusion sheet 182 is disposed on the back surface of the lower substrate 120*b* of the second liquid crystal panel 120. Alternatively, as described above with reference to FIG. 5, the dual display device according to another embodiment of the present disclosure is configured such that the first lower polarizing plate 191 is disposed on the back surface of the lower substrate 110*b* of the first liquid crystal panel 110 and the second lower polarizing plate 192 is disposed on the back surface of the lower substrate 120*b* of the second liquid crystal panel 120.

Therefore, when two display panels are mounted on both surfaces of the backlight unit so as to be tilted at a predetermined angle, it is possible to prevent occurrence of a sense of difference in transparency and to ensure uniform brightness.

Figure 6:
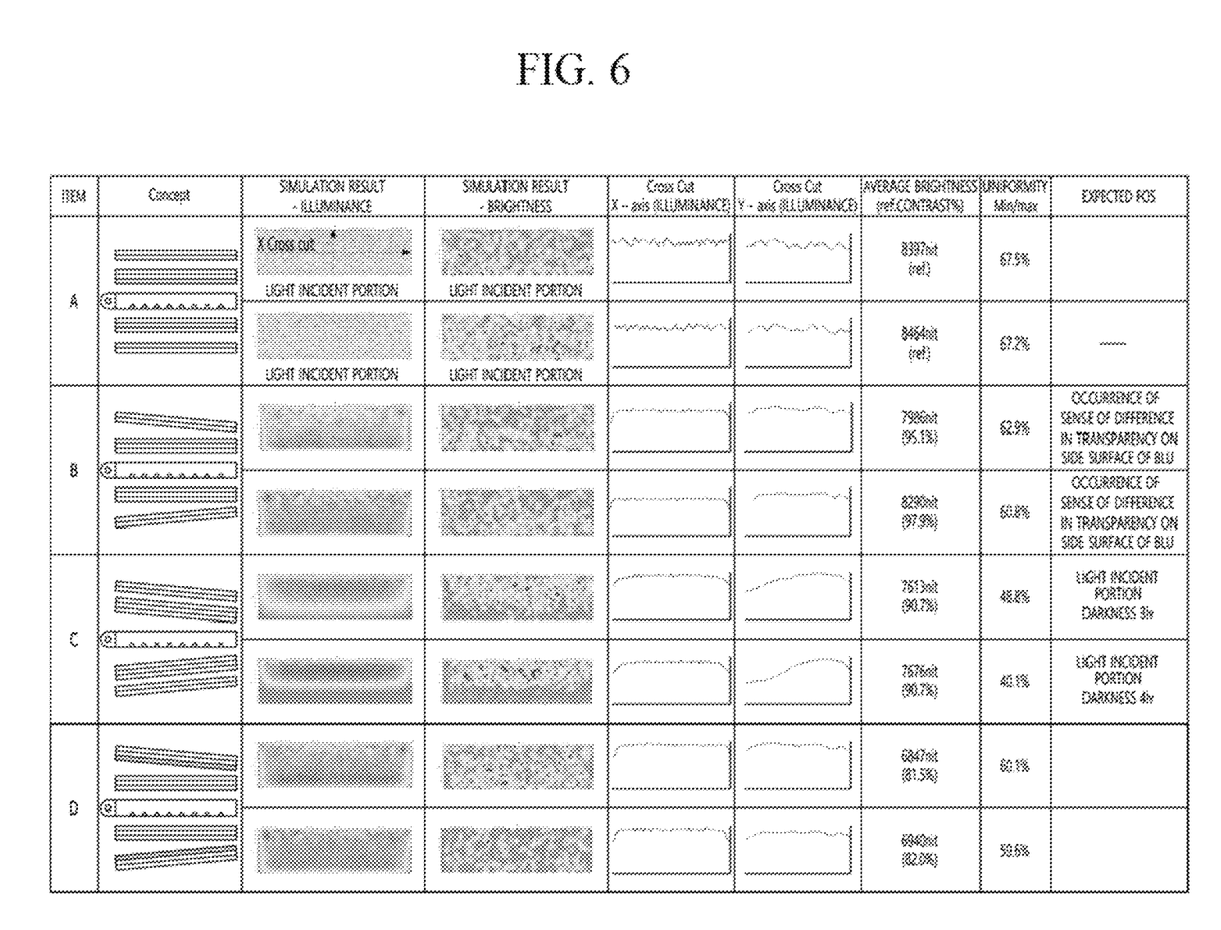
FIG. 6 shows the characteristics of various dual display devices according to one embodiment.

FIG. 6 shows the characteristics of various dual display devices.

"A" in FIG. 6 shows the characteristics of a dual display device using one backlight unit, as described with reference to FIG. 2.

"B" in FIG. 6 shows the characteristics of a dual display device in which when the first and second liquid crystal panels 110 and 120 are disposed on both sides of the backlight unit 170 so as to be tilted at a predetermined angle with respect to the backlight unit 170, the first and second diffusion sheets 181 and 182 or the first and second lower polarizing plates 191 and 192, described with reference to FIGS. 4 and 5, are not attached to the back surfaces of the first and second liquid crystal panels 110 and 120.

"C" in FIG. 6 shows the characteristics of a dual display device in which when the first and second liquid crystal panels 110 and 120 are disposed on both sides of the backlight unit 170 so as to be tilted at a predetermined angle with respect to the backlight unit 170, the first and second diffusion sheets 181 and 182 or the first and second lower polarizing plates 191 and 192, described with reference to FIGS. 4 and 5, are not attached to the back surfaces of the first and second liquid crystal panels 110 and 120, and the first and second optical sheets 130 and 140 are attached to the back surfaces of the first and second liquid crystal panels 110 and 120.

"D" in FIG. 6 shows the characteristics of a dual display device in which when the first and second liquid crystal panels 110 and 120 are disposed on both sides of the backlight unit 170 so as to be tilted at a predetermined angle with respect to the backlight unit 170, the first and second diffusion sheets 181 and 182 or the first and second lower polarizing plates 191 and 192, described with reference to FIGS. 4 and 5, are attached to the back surfaces of the first and second liquid crystal panels 110 and 120.

As can be seen from "B" and "C" in FIG. 6, in the case in which, when the first and second liquid crystal panels 110 and 120 are disposed on both sides of the backlight unit 170 so as to be tilted at a predetermined angle with respect to the backlight unit 170, the first and second diffusion sheets 181 and 182 or the first and second lower polarizing plates 191 and 192, described with reference to FIGS. 4 and 5, are not attached to the back surfaces of the first and second liquid crystal panels 110 and 120, or the first and second optical sheets 130 and 140 are attached to the back surfaces of the first and second liquid crystal panels 110 and 120 without the first and second diffusion sheets 181 and 182 or the first and second lower polarizing plates 191 and 192, the viewer feels a sense of difference in transparency, i.e., feels as if an image floats above the display panel, and brightness uniformity deteriorates.

On the other hand, as can be seen from "D" in FIG. 6, in the case in which the first and second liquid crystal panels 110 and 120 are disposed on both sides of the backlight unit 170 so as to be tilted at a predetermined angle with respect to the backlight unit 170, and the first and second diffusion sheets 181 and 182 or the first and second lower polarizing plates 191 and 192, described with reference to FIGS. 4 and 5, are attached to the back surfaces of the first and second liquid crystal panels 110 and 120, occurrence of a sense of difference in transparency is prevented, and brightness is uniform.

The characteristics of the dual display device may vary depending on the angle at which the first and second liquid crystal panels 110 and 120 disposed on both sides of the backlight unit 170 are tilted.

Figure 7:
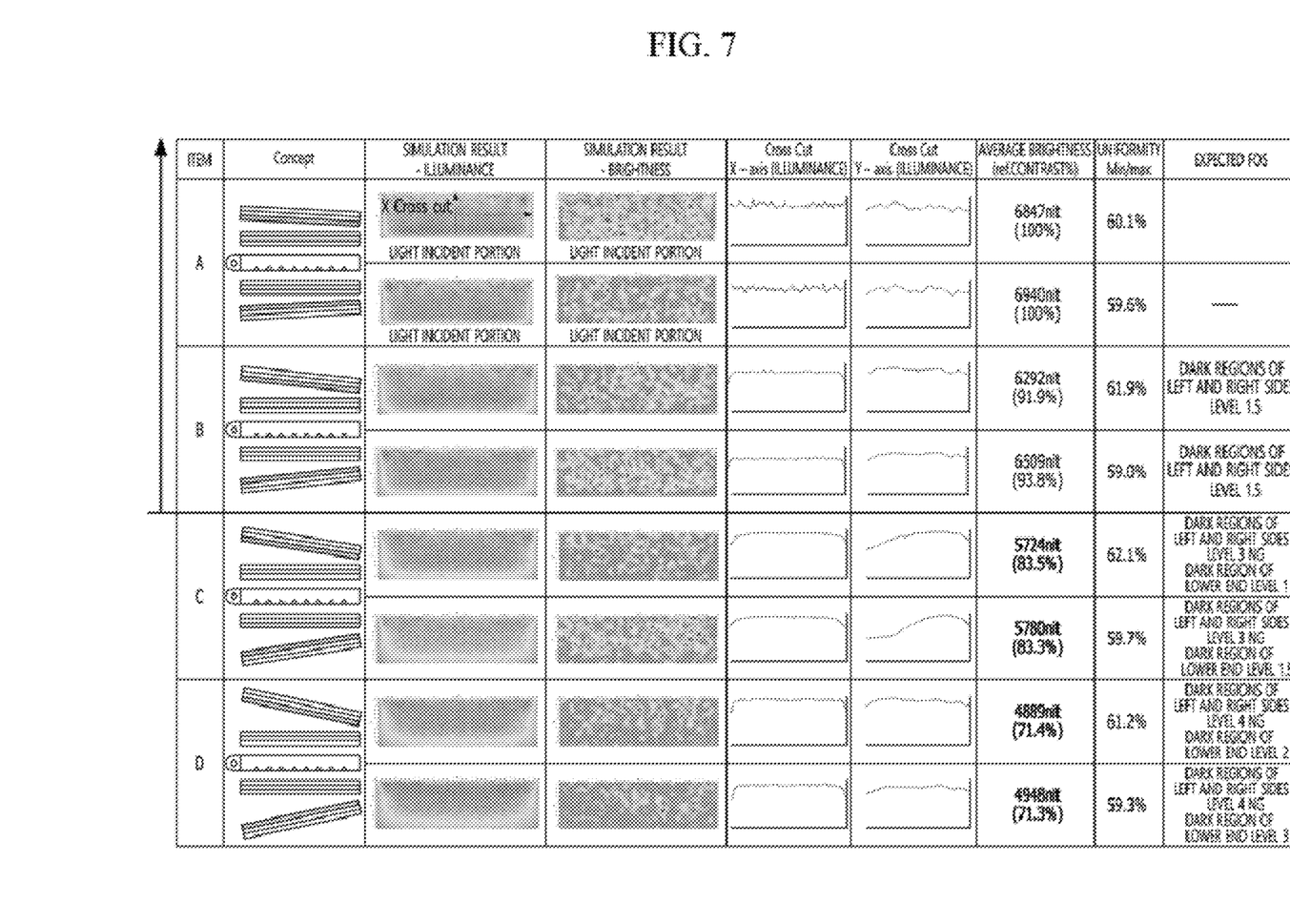
FIG. 7 shows the characteristics of a dual display device according to the tilting angle of first and second liquid crystal panels according to one embodiment.

FIG. 7 shows the characteristics of a dual display device according to the tilting angle of the first and second liquid crystal panels 110 and 120.

"A" in FIG. 7 shows the characteristics of a dual display device in which the first and second liquid crystal panels 110 and 120 are disposed on both sides of the backlight unit 170 so as to be tilted at 15 degrees.

"B" in FIG. 7 shows the characteristics of a dual display device in which the first and second liquid crystal panels 110 and 120 are disposed on both sides of the backlight unit 170 so as to be tilted at 25 degrees.

"C" in FIG. 7 shows the characteristics of a dual display device in which the first and second liquid crystal panels 110 and 120 are disposed on both sides of the backlight unit 170 so as to be tilted at 35 degrees.

"D" in FIG. 7 shows the characteristics of a dual display device in which the first and second liquid crystal panels 110 and 120 are disposed on both sides of the backlight unit 170 so as to be tilted at 45 degrees.

As can be seen from "A" to "D" in FIG. 7, image quality is maintained when the first and second liquid crystal panels 110 and 120 are disposed on both sides of the backlight unit 170 so as to be tilted at an angle of 1 to 25 degrees.

When the first and second liquid crystal panels 110 and 120 are mounted so as to be tilted at a predetermined angle with respect to the backlight unit 170, the image quality of the dual display device may vary depending on the position of the light source 172.

Figure 8:
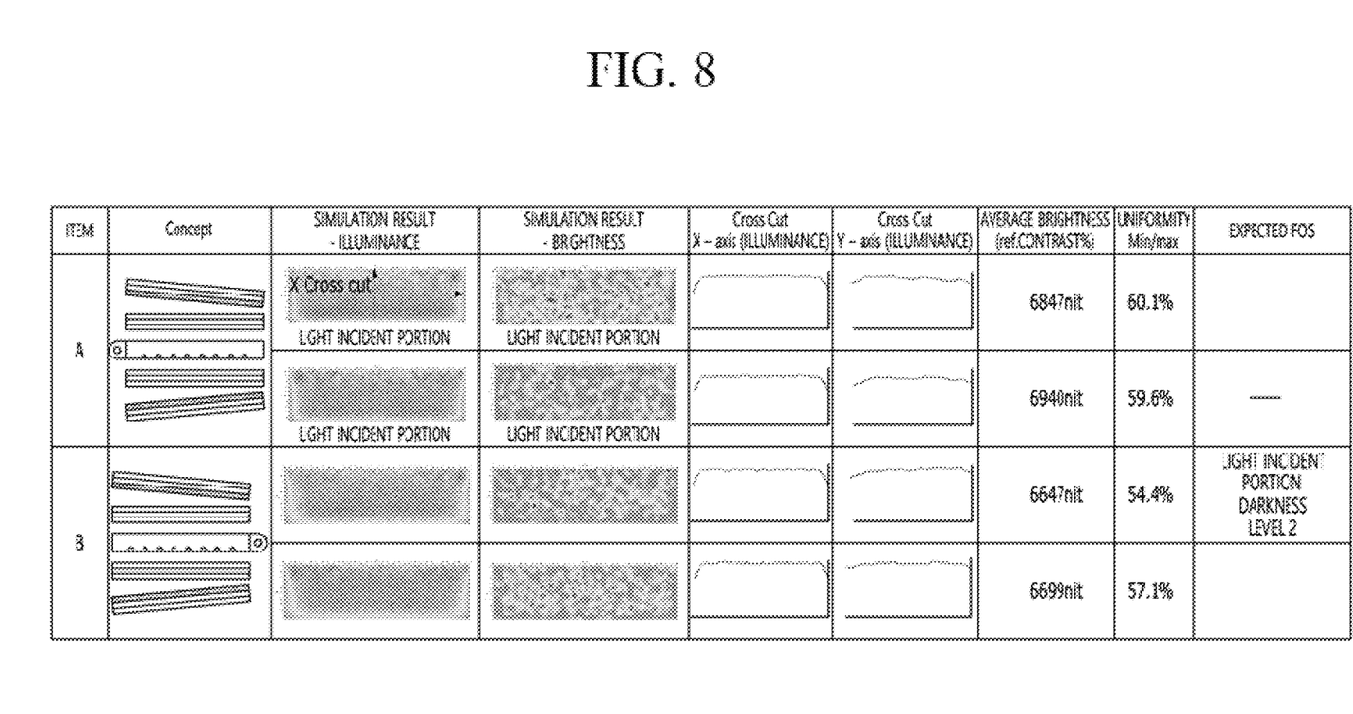
FIG. 8 shows the characteristics of a dual display device in which the first and second liquid crystal panels are mounted so as to be tilted at a predetermined angle with respect to a backlight unit about the edge of a surface of a light guide plate that is opposite a light incident surface of the light guide plate and characteristics of a dual display device in which the first and second liquid crystal panels are mounted so as to be tilted at a predetermined angle with respect to the backlight unit about the edge of the light incident surface of the light guide plate according to one embodiment according to one embodiment.

"A" in FIG. 8 shows the characteristics of a dual display device in which the first and second liquid crystal panels 110 and 120 are mounted so as to be tilted at a predetermined angle with respect to the backlight unit 170 about the edge of the surface of the light guide plate 150 that is opposite the light incident surface of the light guide plate 150 on which the light source 172 is disposed.

"B" in FIG. 8 shows the characteristics of a dual display device in which the first and second liquid crystal panels 110 and 120 are mounted so as to be tilted at a predetermined angle with respect to the backlight unit 170 about the edge of the light incident surface of the light guide plate 150 on which the light source 172 is disposed.

As can be seen from "A" and "B" in FIG. 8, when the first and second liquid crystal panels 110 and 120 are mounted so as to be tilted at a predetermined angle with respect to the backlight unit 170 about the edge of the surface of the light guide plate 150 that is opposite the light incident surface of the light guide plate 150 on which the light source 172 is disposed, average brightness and brightness uniformity are higher than when the first and second liquid crystal panels 110 and 120 are mounted so as to be tilted about the edge of the light incident surface of the light guide plate 150 on which the light source 172 is disposed.

As described above, in the dual display device according to the embodiment of the present disclosure, two display panels are mounted on both surfaces of a backlight unit so as to be tilted at a predetermined angle suitable for the viewer's viewing location, and a diffusion sheet or a polarizing plate having the same haze as the diffusion sheet is disposed on the back surface of each of the display panels. Accordingly, it is possible to reduce power consumption of the dual display device, to improve image quality (front-on-screen (FOS)), to prevent occurrence of a sense of difference in transparency, and to ensure uniform brightness.

As is apparent from the above description, the dual display device according to an embodiment of the present disclosure has the following effects.

First, since two display panels are mounted on both surfaces of a backlight unit so as to be tilted at a predetermined angle suitable for the viewer's viewing location, it is possible to reduce power consumption of the dual display device and to improve image quality (front-on-screen (FOS)).

Second, since a diffusion sheet or a polarizing plate having the same haze as the diffusion sheet is disposed on the back surface of each of the display panels mounted on both surfaces of the backlight unit so as to be tilted at a predetermined angle, it is possible to prevent occurrence of a sense of difference in transparency and to ensure uniform brightness.

Those skilled in the art will understand that various modification and alternations are possible from the above description without departing from the technical idea of the present disclosure. Consequently, the technical scope of the present disclosure is defined by the appended claims, not by the detailed description of the present disclosure.

What is claimed is:

1. A dual display device comprising:
    a backlight unit having a light guide plate;
    a first display panel on a first light exit surface of the backlight unit; and
    a second display panel on a second light exit surface of the backlight unit, the second light exit surface opposite the first light exit surface,
    wherein the first display panel and the second display panel are tilted at a predetermined angle with respect to the backlight unit.

2. The dual display device according to claim 1, further comprising:
    a first diffusion sheet on a back surface of the first display panel facing the first light exit surface of the backlight unit; and
    a second diffusion sheet on a back surface of the second display panel facing the second light exit surface of the backlight unit.

3. The dual display device according to claim 2, further comprising, in place of the first diffusion sheet and the second diffusion sheet:
    a first polarizing plate on the back surface of the first display panel facing the first light exit surface of the backlight unit, the first polarizing plate having a same haze as the first diffusion sheet; and
    a second polarizing plate on the back surface of the second display panel facing the second light exit surface of the backlight unit, the second polarizing plate having a same haze as the second diffusion sheet.

4. The dual display device according to claim 1, wherein the first display panel and the second display panel are tilted at an angle in a range of 1 to 25 degrees.

5. The dual display device according to claim 1, wherein the backlight unit comprises:
    a light source configured to emit light to a light incident surface of the light guide plate;
    a first optical sheet located on the first light exit surface of the light guide plate; and
    a second optical sheet located on the second light exit surface of the light guide plate opposite the first light exit surface.

6. The dual display device according to claim 5, wherein each of the first optical sheet and the second optical sheet comprises at least one diffusion sheet and at least one prism sheet.

7. The dual display device according to claim 5, wherein the light guide plate comprises a concave pattern or a convex pattern on at least one of the first light exit surface and the second light exit surface of the light guide plate.

8. The dual display device according to claim 5, wherein the first display panel and the second display panel are tilted at the predetermined angle with respect to the backlight unit about an edge of a surface of the light guide plate that is opposite the light incident surface of the light guide plate.

9. The dual display device according to claim 5, wherein at least one of the first optical sheet and the second optical sheet comprises one or more diffusion sheets and one or more prism sheets.

10. The dual display device according to claim 5, wherein at least one of the first optical sheet and the second optical sheet comprises two diffusion sheets and one prism sheet.

11. The dual display device according to claim 2, wherein the first diffusion sheet and the second diffusion sheet are tilted at the predetermined angle with respect to the backlight unit.

12. The dual display device according to claim 3, wherein the first polarizing plate and the second polarizing plate are tilted at the predetermined angle with respect to the backlight unit.

* * * * *